United States Patent [19]
Stupak, Jr. et al.

[11] Patent Number: 5,373,407
[45] Date of Patent: Dec. 13, 1994

[54] DISK DRIVE SPINDLE MOTOR

[75] Inventors: Joseph J. Stupak, Jr., Portland, Oreg.; Gregory H. Chao, Northridge, Calif.; Erik Moe, Huntington Beach, Calif.; Keith W. Mayberry, Costa Mesa, Calif.

[73] Assignee: Mitsumi Electric Co., Ltd., Kanagawa, Japan

[21] Appl. No.: 974,986

[22] Filed: Nov. 12, 1992

[51] Int. Cl.5 .............................. G11B 17/02
[52] U.S. Cl. .................................. 360/99.08
[58] Field of Search .............. 360/98.07, 99.04, 99.08; 310/67 R

[56] References Cited

U.S. PATENT DOCUMENTS

| | | | |
|---|---|---|---|
| 4,717,977 | 1/1988 | Brown | 360/98.07 |
| 4,814,652 | 3/1989 | Wright | 360/98.07 |
| 4,905,110 | 2/1990 | Krum et al. | 360/99.08 |
| 4,922,406 | 5/1990 | Schuh | 360/97.03 |
| 4,943,748 | 7/1990 | Shiozawa | 360/98.07 |
| 5,025,336 | 6/1991 | Morehouse et al. | 360/97.02 |
| 5,031,061 | 7/1991 | Hatch | 360/98.07 |

*Primary Examiner*—Robert S. Tupper
*Attorney, Agent, or Firm*—Knobbe, Martens, Olson & Bear

[57] ABSTRACT

A small form factor disk drive having an extremely thin, high-energy product annular magnet within the spindle motor. The magnet includes twelve alternating poles disposed about the periphery and canted from the top edge to the bottom at a slight skew angle. The high-energy product magnet generates a high starting torque which obviates the use of low viscosity lithium bearing greases. A stator disposed concentrically within the magnet has three continuous coils, each coil wound around three spokes of the stator at 120 degree intervals, for a total of nine stator slots. The rotating spindle, bearings and stationary base are constructed of materials having similar coefficients of thermal expansion to reduce stresses on the bearings during periods of temperature elevation. An annular aluminum disk support sole bonds to a ledge on the spindle hub to facilitate machining and provide material compatibility. The disk drive includes various features for reducing the amount of contamination on the disk surface. A double groove bonding configuration eliminates adhesive runout and ensures a consistent bond strength.

33 Claims, 5 Drawing Sheets

DISK DRIVE SPINDLE MOTOR

FIELD OF THE INVENTION

This invention relates to small form factor disk drives for computers and, more specifically, to an improved spindle motor for such disk drives.

BACKGROUND OF THE INVENTION

Disk drive memory systems ("disk drives") have been used to store information for computers for many years. In disk drives, digital information is recorded on concentric memory tracts on magnetic disks. There are two basic kinds of disk drives: "floppy" disk drives and "hard" disk drives. In both kinds of disk drives, disks are rotatably mounted on a spindle. Read/write heads, generally located on pivoting arms, move radially over the surface of the disks to access different memory locations. There may be as many as 3000 or more memory tracks per radial inch of a disk. To ensure proper writing and reading of the information, a read/write head must be accurately aligned with an appropriate track on a disk. Floppy disk drives store information on interchangeable, flexible and magnetic disks. Hard disks store information on rigid non-interchangeable disks, commonly made of aluminum. Hard disks have a much higher storage density than floppy disks.

Hard disks are often located within the housing of a computer and may consist of multiple rigid metal disks stacked on top of each other within the drive. The disks are spun at high speeds by a motor to allow rapid writing and reading of information on the disk. Because of the high storage densities of hard disks, it is extremely important that distortions and misalignments between the disks and the motor spindle, and among the disks themselves, be minimized to allow accurate information exchange between the read/write head and the disk.

Until recently, hard drive systems have not been portable and were housed in large rooms having controlled environments or within non-portable computers housed within such rooms. Consequently, the weight and space occupied by such systems were of little concern. Recently, however, the advent of personal and portable computer systems has placed a premium on providing disk drives of reduced size and weight. The relative size of disk drives is commonly referred to as its "form factor", and is expressed in terms of width. Currently, form factors of 2.5 inches and even smaller are relatively commonplace. Generally, a small form factor of a particular disk drive motor limits the torque generating capability as the magnet must be of a small size.

In-hub motors are presently used in disk drives and are particularly popular in smaller form factor disk drives. In-hub motors require less space than other conventional motors, because the hub the disks ride on carries an integral component of the actual motor, typically a permanent magnet. To produce the required electromagnetic characteristics, present designs for in-hub motors have required the use of hubs made of steel or other ferromagnetic materials. Other motors have an aluminum hub with a ferromagnetic sleeve. Magnets are mounted to the hubs such that the hub or sleeve provide a flux path for the magnets. The use of a steel hub in contact with aluminum disks, however, may create localized frictional sticking points from discontinuous thermal swelling and contracting. Subsequent displacement of the disks, and therefore potential misalignment of embedded servo tracks on the disk, will detrimentally cause the read/write heads to track an out-of-round path. Aluminum hubs, on the other hand, thermally expand faster than the typically steel bearings and motor base the hub rotates on, resulting in varying or excessive stresses on the bearings.

U.S. Pat. No. 4,814,652 to Wright, discloses a disk drive motor with thermally matched parts. The disk drive includes an aluminum hub which is compatible with the aluminum disks, and will not create distortion or misalignment upon thermal expansion or contraction. The drawback to this design is that the magnet within the aluminum spindle hub requires a magnetic flux return path which cannot be provided by the aluminum. Thus, a steel flux return sleeve is inserted inside the aluminum spindle hub adjacent the magnets. The reduction in thickness of the spindle hub wall due to the addition of a steel magnetic flux return sleeve, renders the walls of the spindle hubs susceptible to bending when a downward load is placed on the disks stacked on top of the spindle hub. Any such bending will cause a misalignment in the disks as well, detrimentally affecting the storage and retrieval of data.

An important factor affecting the performance of disk drives is the entry of contaminants, such as dirt, dust or moisture, into the housing. However, past attempts to hermetically seal the inner space of the disk drive has resulted in problems such as leaking at high altitudes because of pressure differences, and condensation within the inner space. Presently, disk drives use ambient or breather filters to prevent the entry of contaminants into the interior of the housing. Desiccants, or chemical absorbents, are occasionally used in these filters to absorb moisture before it enters the housing. Another related problem has been contaminants generated within the housing. Such contaminants would result from particulate matter flaking off components within the housing.

Gaseous contaminants, such as bearing greases containing lithium, can be very harmful when deposited on the disk drive surfaces. Unfortunately, lithium-based bearing greases have been preferred for their lower viscosity and lower running friction. Conventional small form factor spindle motors having low torque are currently limited to using low viscosity greases. However, when deposited on the disk surface, lithium rapidly increases the static coefficient of friction. Other hydrocarbons used in bearing greases can also out-gas, drifting around the inside of the disk drive housing, eventually being deposited on the disk surface. Outgassed hydrocarbons are generated when the temperature of the bearing grease is raised and might otherwise deposit in a thin film on the surface of the aluminum disks.

Contaminants on the disk surfaces increase the static coefficient of friction of the disk under the magnetic head which can create a condition known as "stiction" or when the head sticks momentarily prior to lifting off from a stationary position on the disk. Large amounts of stiction may actually prevent smaller form factor/small torque motors from turning. That is, there is a relatively low limit to the amount of electrical power available in smaller form factor motors to increase torque and overcome such stiction. Additionally, the size requirements and the increased difficulty of manufacturing thin magnets of highly magnetic material limit the strength of permanent magnets available for in-hub motors.

Furthermore, cogging, or a wasteful motion of the motor hub tangential to the axis of rotation, is a problem with high-energy-product magnets, sometimes utilized to increase the torque of motors. Cogging vibrations are caused by the sudden changes in magnetic attractions when the poles of the magnet rotate around the discrete structural features of the ferromagnetic stator. Low-inertia hubs, such as in small form factor drives, increase the relative impact of torque variations caused by strong magnets.

Problems with liquid adhesive contamination of bearing greases has proved a difficult problem as well. Prior means for adhering bearings to spindle shafts utilize only one bonding groove, prompting variable filling of the grooves with adhesive. Excessive adhesive overflows as the bearing is pushed onto the shaft, or within a motor base flange. This adhesive overflow in many cases would then contaminate the bearing grease. One solution is to reduce the amount of adhesive deposited in the single groove to avoid pushing any excess outside of the bearing. However, this results in a less than solid or maximum bond between the bearing and the respective spindle or motor base surface, to the point that poor bond integrity may affect the maintenance of a consistent preload on the bearings.

Presently, there is a need for a small form factor disk drive motor which overcomes these problems.

SUMMARY OF THE INVENTION

The present invention provides an improved spindle motor for very small form factor (i.e. 2.5 inches) computer disk drives. The spindle motor comprises elements which alone, or in combination, overcome static friction (stiction) of the read/write head on the static disc and increase bearing life. The present invention substantially eliminates problems associated with mismatching of materials having different coefficients of thermal expansion. In addition, the present invention facilitates manufacture and assembly of the spindle motor.

According to one aspect of the preferred embodiment, the present spindle motor incorporates a very thin magnet having a high energy product. The size of the magnet helps reduce the overall size of the spindle motor, and thus reduces the form factor of the disk drive. The high energy product magnet results in a high torque motor which can more easily overcome the problems of stiction. In addition, the higher torque motor allows for the use of a higher viscosity grease for the bearings of the motor. The higher viscosity grease emits substantially less contaminants into the disk drive housing, which contaminants could be detrimental if they settle on the disk surfaces.

The preferred annular magnet comprises twelve magnetic poles which surround a stator having three continuous windings. Each winding, or phase, wraps around three spokes of the nine spoke stator, the three spokes being angularly disposed 120° from each other in a Y-configuration, thus forming nine "slots" at which discrete electromagnetic force fields may be created. Sequentially, two windings; or six slots, of the stator are energized to interact with the surrounding twelve magnet poles and provide a balanced mechanical force vector distribution.

In a preferred embodiment, the annular magnet used in the spindle motor is made of neodymium and manufactured to a thickness of less than 1 mm. The alternating poles arranged around the periphery of the annular magnet are skewed with respect to the central axis of the magnet. The skewed poles substantially reduce or eliminate cogging, especially with low-inertia spindles.

In one preferred embodiment, the present invention features a pair of activated charcoal and desiccant filters for reducing gaseous contaminants within the disk drive housing. A breather filter disposed in an aperture of the housing intercepts contaminants from outside the disk drive. A small amount of desiccant dispersed in the activated charcoal of the breather filter absorbs water vapor which might otherwise enter the disk drive. The activated charcoal and desiccant are embedded in a synthetic matrix which prevents migration within the filter and remains intact even when the filter is ruptured. An adsorption filter, also comprised of activated charcoal and desiccant embedded in a synthetic matrix, is fixed to the inner surface of one cover of the disk drive. The adsorption filter substantially reduces the concentration of out-gassed hydrocarbons within the disk drive housing and absorbs whatever water vapor passed through the breather filter.

In still another aspect of the present invention, solid contaminants from the adhesive used to bond the bearings to the spindle, and also to the motor base, are controlled during assembly so that they cannot migrate into the grease of the bearings, resulting in damage thereto. Double grooved adhesive channels are provided on the spindle and motor base surfaces opposing the inner and outer race of the motor bearings, respectively. A first groove of each double groove pair is consistently filled with adhesive to ensure the integrity of the final bond. Any excess adhesive which is pushed out of the first groove by the advancing bearing is deposited in the second groove so as not to be finally deposited on a surface adjacent the bearing grease. In this manner, there is a much lower percentage of rejects due to incorrect deposition of the adhesive.

In addition to reducing contamination from adhesive overflow, the ability to consistently fill the first, or bonding, groove allows the maintenance of a consistent preload on the bearings within the motor. Maintaining a consistent preload substantially controls both the amount of runout and the level of Hertzian contact stresses experienced within the bearings.

In still a further aspect of the present invention, the Hertzian contact stresses are controlled within certain ranges during operation of the motor due to the identical interface material on both sides of the bearing. This results in an even amount of thermal expansion and contraction during temperature changes. The bearings themselves are constructed of a material with a similar coefficient of thermal expansion.

In a preferred embodiment, both the spindle hub and the base of the motor, which comprise the surfaces which contact the bearings, are made of Martensitic steel. The hub and the motor base are both nickel plated to eliminate corrosion which could be extremely damaging to the disk drive. Furthermore, the material of the hub acts as a magnetic flux return path for the motor, eliminating the need for a separate magnetic flux sleeve which had been necessary with aluminum hubs of the prior art. The Martensitic steel hub possesses sufficient stiffness to support the clamping force applied on top of the disks without bowing.

In accordance with another embodiment of the present invention, a flat aluminum sole, or ring, is provided over the top of a flange of the spindle hub on which the aluminum disks lie. The use of aluminum disks and the aluminum sole results in equal thermal expansion rates at the contact surface thus eliminating any localized sticking otherwise present between differentially expanding surfaces. Advantageously, the aluminum sole facilitates machining of the disk support surface, which must be finished or machined to exacting tolerances after complete assembly of the motor. The presence of the preferred aluminum sole thus removes the need to machine the nickel plating on the hub flange, preserving the anti-corrosive feature. In addition, the aluminum is much easier to machine than the Martensitic steel, and thus less stress is applied on the bearings of the motor from the machine tool, leading to a longer bearing life.

In accordance with still another aspect of the present invention, the assembly procedure of the present spindle motor is facilitated by the grouping of some of the elements into subassemblies. Specifically, there is a first hub sub-assembly to which the magnet and bearings are bonded to first. This first sub-assembly is then placed over and bonded to the base sub-assembly, including the stator, windings and electrical connections which is manufactured separately.

DETAILED DESCRIPTION OF THE INVENTION

Figure 1:
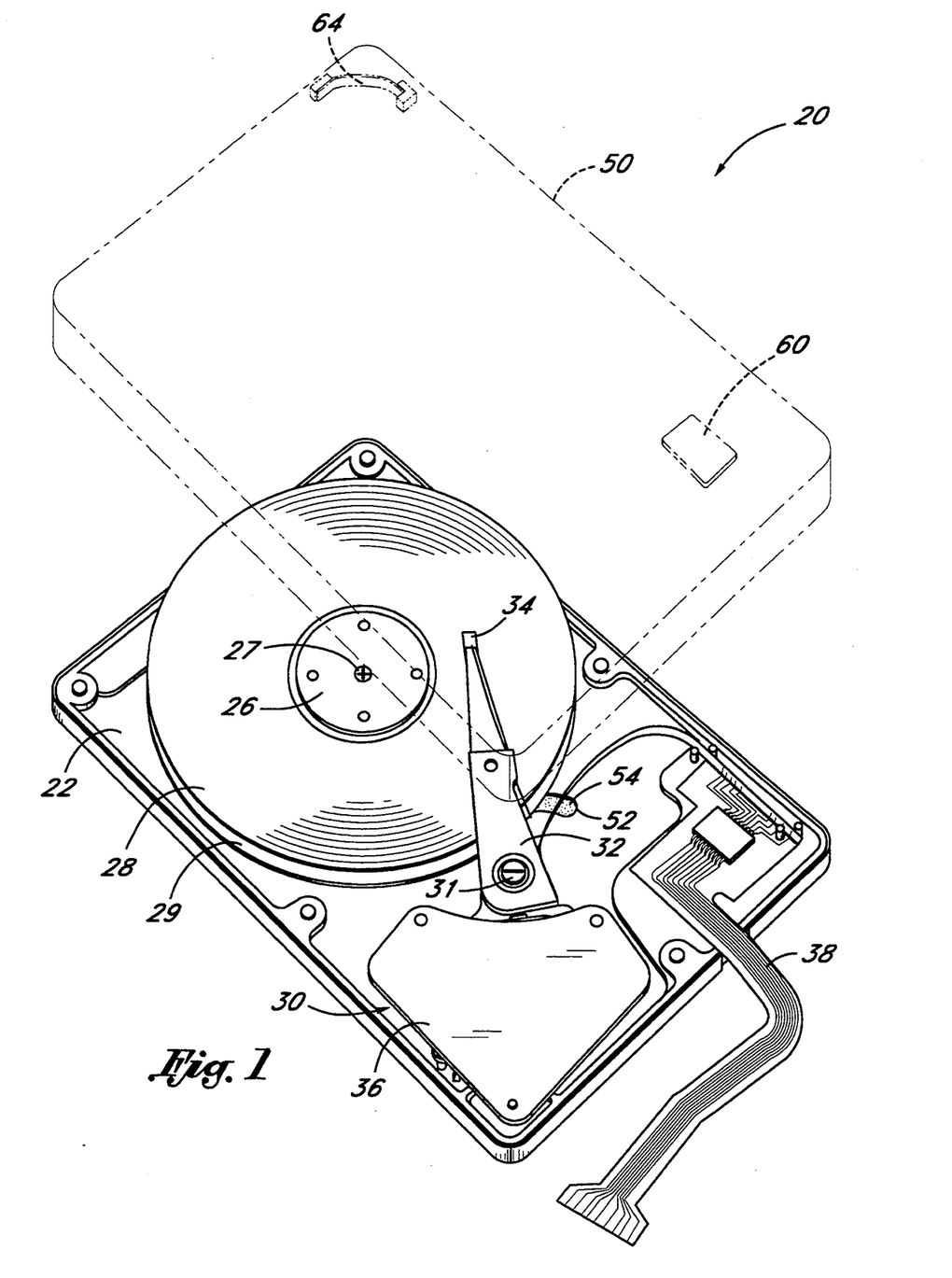
FIG. 1 is a perspective view of a small form factor disk drive incorporating the elements of the present invention with the cover removed and shown in phantom lines.

Referring to FIG. 1, a typical small form factor hard disk drive mechanism 20 is shown. The disk drive 20 may incorporate a variety of features, such as those shown in copending applications Ser. No. 07/975,386, filed Nov. 12, 1992 entitled ROTARY DISK DRIVE ACTUATOR; Ser. No. 07/975,503, filed Nov. 12, 1992 entitled DISK DRIVE POWER CONTROL CIRCUIT AND METHOD; and Ser. No. 07/975,593, filed Nov. 12, 1992 entitled DISK DRIVE AND METHOD FOR FORMATTING HARD DISK, all commonly owned with the present application. The disk drive 20 comprises of a base 22, a spindle motor 24 (FIG. 2) receiving a stack of one or more disks 28, 29, an actuator 30, and one or more actuator arms 32 that pivot about an axis 31 and support magnetic heads 34 for reading and/or writing information from either side of the disks. The spindle motor 24 is hidden in FIG. 1 by a spring clamping plate 26 attached with a screw 27. This plate 26 clamps down on the disks 28, 29 in the stack and holds them in a fixed relation vertically and in relation to the spindle motor 24.

The operation of the disk drive 20 is as follows. Signals sent through leads 38 stimulate both the actuator motor (not shown) under a flux plate 36 and the spindle motor 24. The spindle motor 24 turns the disks 28, 29 at high revolutions and the actuator motor moves the actuator arms 32 radially across the rapidly spinning disks. In this configuration, two disks 28, 29 are shown stacked on the spindle motor 24 in FIG. 1 and a second actuator arm (not shown) reads and/or writes from both sides of the lower disk. This configuration is not meant to limit the scope of the present invention, it being well known that one or more disk may be stacked in small form factor disk drives.

Contaminant Filters

As shown in FIG. 1, a disk drive cover 50 fits over the top of the base portion 22 of the disk drive 20. The cover 50 is typically mounted to the base 22 with screws or other fasteners and nominally seals the inner space of the disk drive 20 from outside contaminants. An arcuate hole 52 in the base 22 is provided to allow the inside space of the disk drive 20 to "breath". The disk drive 20 breathes during each cycle of operation as the temperature rises and falls within the inner space. An activated charcoal breather filter 54 fills the arcuate hole 52 to intercept most, if not all, of the outside atmospheric contaminants which might enter the disk drive 20 and settle on the disks 28, 29. The activated charcoal has a particular adsorption affinity for fluorous, sulphurous and other gaseous chemical compounds prevalent in the atmosphere.

Humidity within the inner space can also raise the coefficient of friction on the disk surface. A small amount of desiccant, or moisture absorbent chemical, typically silica, is provided in the breather filter 54 to intercept and absorb any water vapor in the atmosphere which might enter the disk drive housing 20. The activated charcoal and desiccant are embedded in a synthetic matrix rather than being loose inside the filter 54 as are many conventional filters. The use of this embedded charcoal in a synthetic matrix eliminates the tendency for the activated charcoal and desiccant to migrate, and holds the components in place in the case of rupture.

A hydrocarbon adsorption filter 60 mounts under the cover 50 of the disk drive. This adsorption filter 60 also contains an activated charcoal embedded in a synthetic matrix which adsorbs any free floating hydrocarbons within the disk drive housing. A small amount of desiccant is also provided in the adsorbent filter 60 to further intercept and absorb any water vapor in the disk drive housing 20. The activated charcoal of the adsorption filter 60 has a particular affinity for the hydrocarbons constituent in the preferred bearing grease of the present invention. Free floating hydrocarbons are generated by the workings of the spindle motor 24 or actuator 30, and commonly are released when the grease in the bearings of these motors is heated and evaporates or "out-gasses". The hydrocarbon molecules, if allowed to float freely within the disk drive 20, would eventually settle and adhere to the surface of the aluminum disks 28, 29. This would increase the coefficient of friction of the disks and affect the flying performance of the magnetic read-write heads.

The activated charcoal filter 60 substantially removes all of the hydrocarbons within the disk drive 20 and helps avoid exceeding the manufacturer's stated coefficient of friction for the disks 28, 29. With the trend to smaller form factor disk drives, the spindle motors are less powerful and have a smaller starting torque. In general, the aluminum disks from the manufacturer have a coefficient of friction which ranges from 0.2 to 1.5. The present disk drive spindle motor 24 has an improved starting torque which can overcome a coefficient of friction of 1.5. Any hydrocarbon contamination on the disk drive which raises the friction factor would be extremely detrimental to the spindle motor 24 and, might in fact burn the motor out if excessive.

A third filter 64 mounts under the cover 50 of the disk drive as well. This filter 64 intercepts and collects any particulate matter generated within the disk drive inner space. Preferably, the filter is mounted vertically proximate a corner of the cover directly in the path of the airstream created by the spinning disks, to more effectively capture particles.

Spindle Hub

Figure 2:
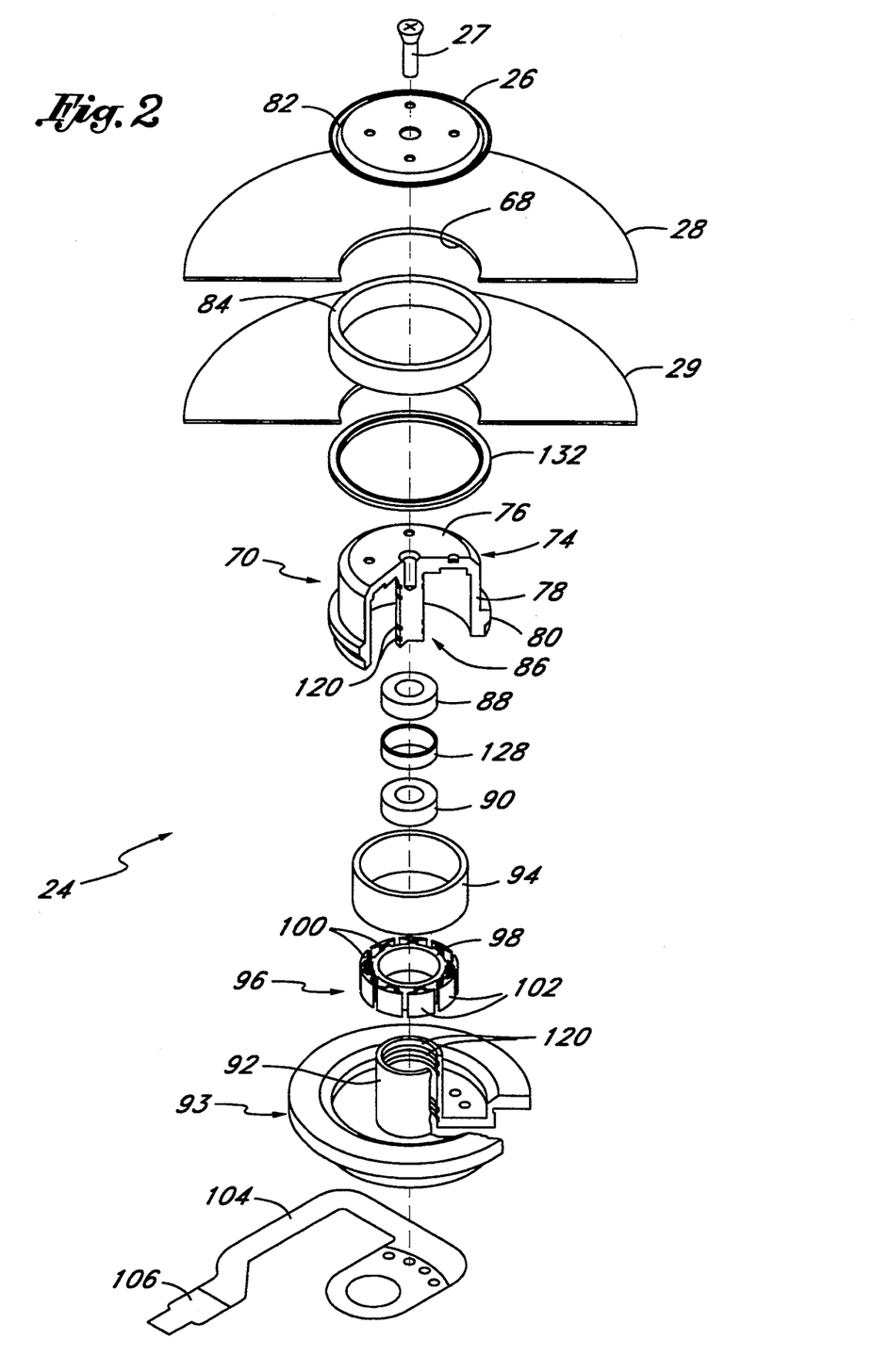
FIG. 2 is an exploded perspective view of the spindle motor used in the disk drive of FIG. 1.

The spindle motor 24, shown exploded in FIG. 2, receives the central bores 68 of the computer disks on a spindle 70. An inverted cup-shaped hub 74 of the spindle 70 comprises a flat top portion 76, a cylindrical vertical side rim 78 and a lower horizontal annular flange 80. Hub 74 is partially cut away to reveal a shaft 86 having peripheral grooves 120, described below in more detail.

The computer disks 28, 29 fit over the top portion 76 of the hub 74 and snugly against the side wall 78 to rest on the annular flange 80. The clearance between the inner diameter of the disk bores 68 and the outer diameter of the side wall 78 of the hub 74 is kept extremely small to eliminate relative movement therebetween. Any looseness would affect the relative positions of the embedded servo tracks on the disks 28,29 and thus influence the actuator heads 34 flying over the disks reading and writing information. Likewise, the flatness, or smoothness, of the annular flange 80 must be extremely accurate so that there are no vertical discontinuities on this inner disk support surface. Any variation in the height of the support under the disks 28, 29 would cause the disks to rise up towards or away from the heads 34, thus affecting the heads' flying performance.

Figure 3:
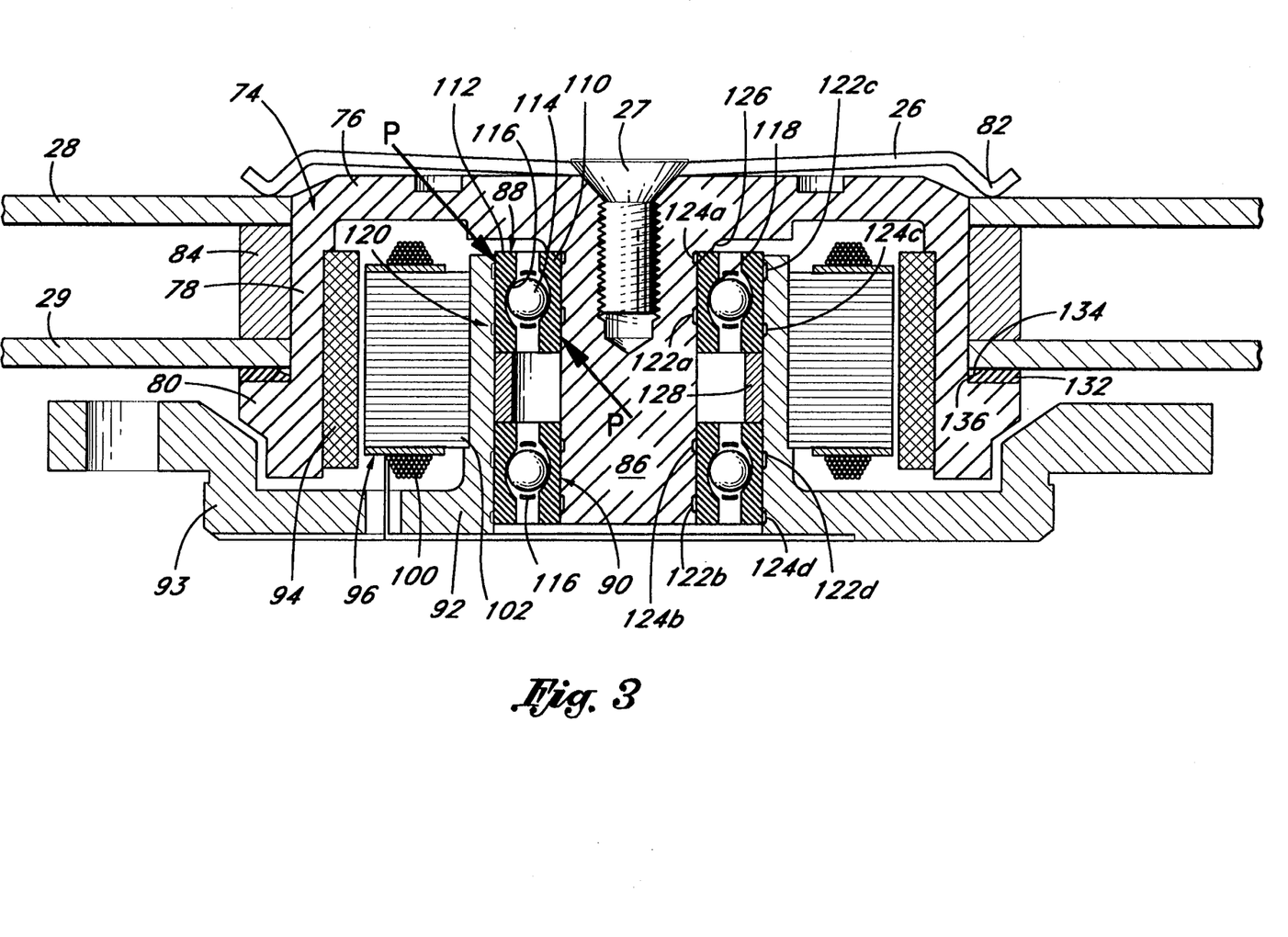
FIG. 3 is a cross-sectional view of the assembled spindle motor.

Referring now to FIGS. 2 and 3, the two aluminum data disks 28, 29 are shown mounted over the spindle hub 74 by the disk clamping plate 26. The center of the clamping plate 26 affixes to the top 76 of the hub 74 with a screw 27. The peripheral edge of the plate 26 includes a downwardly bent circular elbow 82 which applies a downward force on the upper surface of the top disk 28 when the screw 27 is tightened due to the cantilevered plate configuration. The top disk 28, in turn, sits on an annular disk spacer 84 supported by the bottom disk 29. The disk spacer 84 is accurately machined to a height which allows the actuator arms to move between the disks.

The downward force of the disk clamping plate 26 is transmitted through the bottom disk 29 to the annular flange 80 of the hub and can be between 23 and 35 pounds such that the applied moment on the horizontal upper surface 76 of the hub can be quite substantial. To avoid any downward bending of the hub 74 from the applied force, the spindle 70 is manufactured from martensitic steel which is quite stiff. There are other advantages to the use of martensitic steel which will be discussed below. The entire spindle 70 is nickel plated to prevent contamination of the inner space of the disk drive from products of corrosion.

Stator

Referring to FIG. 2, the spindle 70 also includes the shaft 86 extending downwardly from the underside of the top portion 76 of the spindle hub 74. Two annular bearings 88, 90 provide a rotatable coupling between the shaft 86 of the spindle and a hollow cylindrical flange 92 extending upwardly from a motor base 93. The motor base 93 firmly mounts to the disk drive base 22 with conventional screws or other fasteners. An annular magnet 94 bonds to the interior of the spindle hub side wall 78 to rotate in proximity around a stator 96 similarly bonded to the exterior surface of the base flange 92, the combination therefore providing the electromagnetic drive means.

The stator 96 bonded to the stationary outer surface of the upwardly extending base flange 92 comprises a substantially circular spoked frame 98 around which coil wires 100 are disposed. Nine outwardly extending spokes 102 on the circular frame 98 for receiving the coil windings 100 are provided. Three continuous windings 100 each wrap around three of the spokes 102 at positions 120° apart, each winding thus being distributed about the spoked frame 98 in a generally Y-shape. To further clarify, sequential spokes 102, each 40° apart, will arbitrarily be given numerals 1-9 (not shown). Each winding 100 may represents a phase. Phase A wraps around spokes 1-4-7, phase B around spokes 2-5-8, and phase C around spokes 3-6-9.

Wires 104, running to and from the windings 100, connect the stator 96 with a lower printed circuit 106 bonded to the underside of the motor base 93.

The current through the three phases or windings 100 is alternated in a desired pattern to create attraction and/or repulsion forces on the surrounding annular magnet 94, thus turning the spindle 70 about the base flange 92. The alternating energizing of the three windings or phases produces a smooth motor operation, analogous to having three motors in one. That is, energizing only one winding creates an alternating torque during a full 360° electrical cycle. Advantageously, the present spindle motor, having a preferred twelve magnet pole-to-nine stator winding ratio, commutates the torque contribution from each winding to maximize efficiency.

Figure 6:
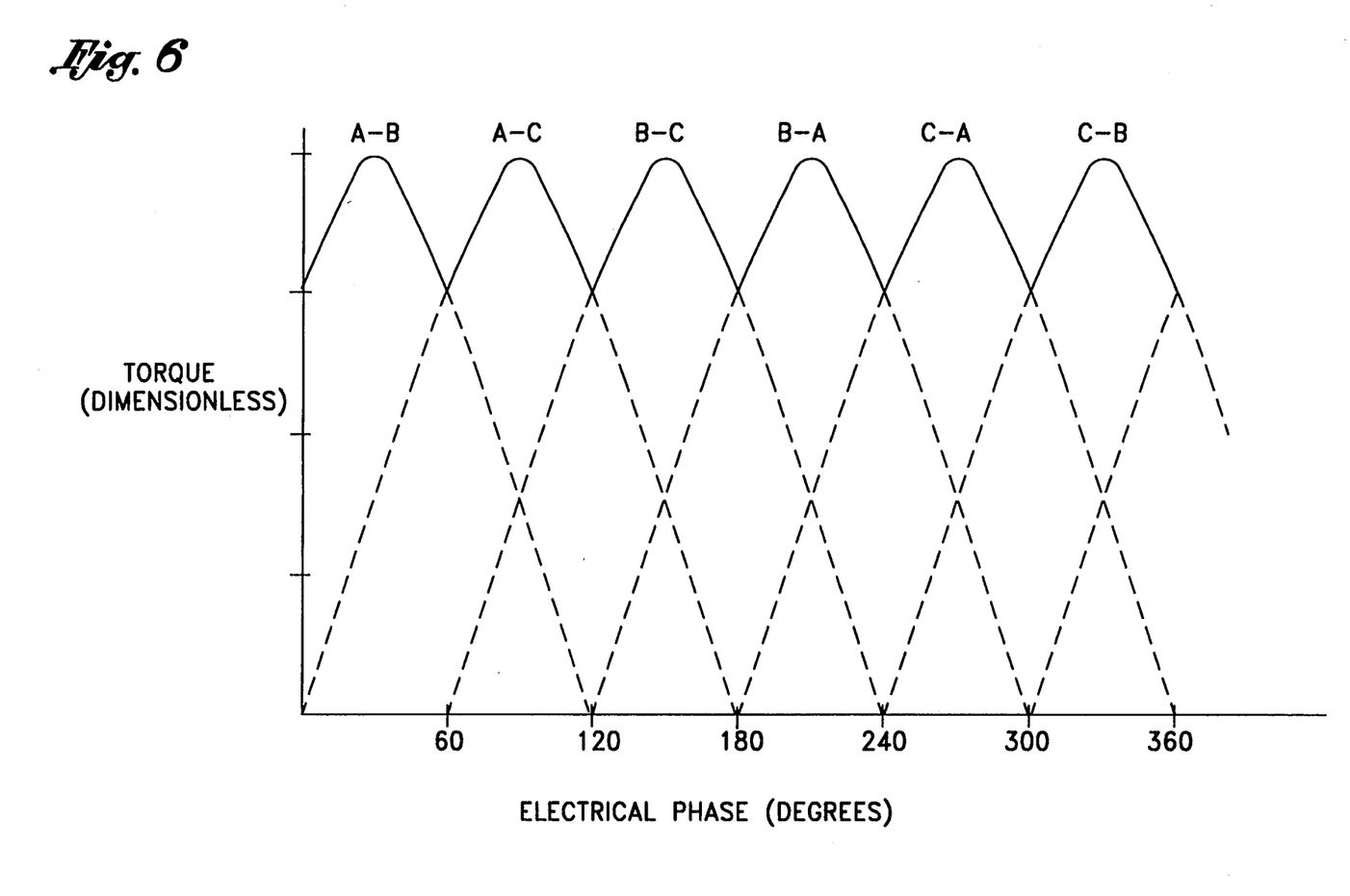
FIG. 6 is a torque profile graph of the preferred spindle motor of FIG. 2.

Referring to FIG. 6, a different phase or winding pair are energized every 60° within a full electrical cycle, corresponding to a 10° mechanical rotation. In this regard, the sequence of energizing the phases may be AB-AC-BC-BA-CA-CB during a full 360° electrical cycle. The energizing sequence is managed such that the resultant torque profile, as seen in FIG. 6, is commutated and torque ripple is small. The contributing upper portion of the torque profile of each winding pair is shown in solid lines, resulting in an overall torque profile with a reduced ripple.

Bearing Stress Control

Another advantage incorporated within the spindle motor 24 is the thermal compatibility of the materials of the spindle 70, bearings 88, 90 and motor base 93. Specifically, both the spindle 70 and motor base 93 are constructed of martensitic steel which is very hard and provides advantageous stiffness features as described supra. The bearings 88, 90 themselves are made of a different type of steel but with a similar coefficient of thermal expansion. Preferably, the spindle 70 and motor base 93 are constructed of a Martensitic steel having a coefficient of thermal expansion of 5.6 E-6 in/in/°F. Additionally, the bearing are 5210 stainless steel with an identical coefficient of thermal expansion of 5.6 E-6 in/in/°F. Simulations have shown that the coefficient of thermal expansion of the bearings may vary as much as 10% more or less from that of the spindle and motor base 93 without detrimentally affecting the initial preload during use of the disk drive 20.

When the spindle motor 24 is in use and begins to heat up from electrical resistance heat dissipation and from outside heat sources, the rate of thermal expansion of the cooperating parts surrounding the bearings 88, 90 is similar and highly fluctuating stresses are avoided. Moreover, steel expands at a lower rate than aluminum resulting in low overall expansion stresses on the bearings 88, 90. Similarly, during the cooling cycle the steel parts contract together. In contrast, prior hubs were made of aluminum which expanded and contracted more than the steel base creating an interference or runout problem as the forces exerted on the bearings changed substantially during use.

In the present invention, a preload P of between one and two pounds, and advantageously one and one-half pounds, is applied at a predetermined angle to the bearings 88, 90 so that run-out is controlled and the contact stresses within the bearing are not excessive. As seen in FIG. 3, the bearings 88, 90 comprise an inner race 110 and an outer race 112 between which a plurality of balls 114 surrounded by retainers 116 are disposed. Each of the inner and outer races includes an inner recess 118 which cradles the ball bearings 114. The preload P is applied at an angle so that the balls 114 contact the surfaces of the recesses 118 at points other than directly across a centerline. This prevents runout, or shifting of the centerline, of the bearings 88, 90 as they are bonded in this configuration with the preload applied. The Hertzian stresses generated during thermal expansion of the races 110, 112 will not be excessive and the looseness or runout from thermal contraction will also be limited due to the preferred thermal compatibility of the spindle 70, bearings 88, 90 and motor base 93.

The present invention also comprises an improved means for mounting and affixing the bearings 88, 90 to the spindle shaft 85 and base flange 92 further controlling the preload on the bearings. As seen in FIG. 3, both the upper 88 and lower 90 bearings cover double bonding grooves 120 on both the spindle shaft 86 and upwardly extending base flange 92 for a total of eight grooves. Adhesive fills one of each groove pair so that each bearing 88, 90 is held to the shaft 86 and the flange 92. Each groove pair includes a first bonding groove 122 and also a second reservoir groove 124 for receiving overflow or excess liquid adhesive which will be deposited therein during installation and not be scraped in front of the bearing.

The assembly procedure comprises filling the lower groove 122a of the top double groove pair on the spindle shaft 86 with a certain amount of adhesive, such as LOK-TITE, or any other suitable adhesive well known in the art. The upper bearing 88 slides over the shaft 86 so that any excess adhesive from the lower groove 122a of the top double groove pair is pushed ahead of the bearing and deposited into the upper reservoir groove 124a of the pair. The bearing is abutted up against an interior shoulder 126 of the spindle hub 74. An annular bearing spacer 128 slides over the spindle shaft 86 into contact with the upper bearing 88. A certain amount of adhesive is deposited in the lower groove 122b of the bottom double groove pair on the spindle shaft 86 at which point the lower bearing 90 slides over the shaft.

As with the upper bearing 88, the lower bearing 90 pushes any excess adhesive from the lower groove 122b of the bottom bonding groove pair into the upper reservoir groove 124b and thus no overflow occurs. Both bearings 88, 90 are thus bonded to the spindle shaft 86 with the full strength of the adhesive within the bonding grooves 122a,b of each double groove pair. Some strength is added to the bond due to the excess adhesive in the reservoir grooves 124a,b of each double groove pair. The control of the adhesive in the primary bonding grooves 122a,b ensures bond integrity and allows for a more consistent preload to be maintained than with prior single groove bonds.

The annular magnet 94 bonds to the interior of the spindle hub side wall 78 and the stator 96 similarly bonds to the exterior surface of the base flange 92 prior to assembling the spindle 70 over the base flange. The outer races 112 of the two bearings 88, 90 bond to grooves in the inner surface of the base flange 92 in a similar manner as described above for the bearing-spindle shaft assembly, however, the double grooves in the base flange are arranged in an inverted manner as compared to those on the spindle shaft. As shown in FIG. 3, the primary bonding grooves 122c,d on the base flange are the upper grooves, and the reservoir grooves 124c,d are the lower grooves for each double groove pair. Thus, as the spindle assembly (with bearings) descends over the base flange 92, the outer races 112 of the bearings push any excess adhesive from the upper groove 122c,d into the lower groove 124c,d of the bonding pairs. The bonding groove 122 in each groove pair is slightly larger in the height dimension than the reservoir groove 124, reflecting the need for a sufficient adhesive contact area in the bonding groove, whereas the reservoir groove should only be large enough to receive a typically small amount of overflow. Other arrangements are possible, however. The bonding strength is as described for the interface between the inner bearing races 110 and the spindle shaft 86.

Aluminum Sole

Referring to FIG. 2, a flat annular aluminum sole 132 fits over the spindle hub 74 between the lower data disk 29 and the outwardly extending annular flange 80 of the hub. Due to the exacting vertical tolerances at which the disks 28, 29 need be positioned relative to the disk drive base 22, and attached actuator 30, the aluminum sole 132 facilitates machining of the surface on which the disks are supported, after assembly of the spindle to the base.

As seen in FIG. 3, the aluminum sole 132 includes a machining clearance taper 134 on its upper surface adjacent an inner bore 136. The taper 134 provides an overrun clearance for a machining tool when finishing the top surface of the aluminum sole 132. Advantageously, the machining operation can then be done after the sole 132 is epoxied to the hub 74 without contacting the hub or leaving any corner material above the top surface of the sole. Thus, the top of the sole 132 may be finished to exacting tolerances with a minimum of trouble due to the machinability of the aluminum. The advantageous machinability of the aluminum also lowers the applied machine tool force, thus relieving some stress on the annular bearings 88, 90 around the shaft 86 of the hub and extending their useful lives.

Furthermore, placing the aluminum sole 132 over the nickel plated hub 74 also preserves the anti-corrosive layer of nickel which would otherwise be machined off of the flange 80 during the final assembly phase. In addition, the aluminum data disk/aluminum sole interface results in a compatible thermal coupling, wherein thermal expansion and contraction of the two surfaces occurs in tandem. Without thermal compatibility, any discontinuities present between the sole 132 and disk 29 might create points of localized tension and sticking, possibly repositioning the disk relative to the sole causing embedded servos to become misaligned.

Magnet

The thin annular magnet 94 bonds to the inner surface of the vertical side 78 of the hub adjacent the stator 96 so that there is a small gap therebetween. As was stated infra, alternating current passed through the coils 100 will impart rotational moment on the spindle 70 as the magnetic fields produced by the stator 96 and those of the permanent magnet 94 interact.

The present invention incorporates a high energy product, extremely thin neodymium magnet 94 which overcomes many of the prior problems in disk drives and at the same time allows a reduction of form factor. Although neodymium magnets have been used before, the neodymium is extremely difficult to machine due to its extreme brittleness. Thus, the ability to manufacture and incorporate an extremely thin annular neodymium magnet into the current spindle motor contributes to a reduction in overall disk drive size. The current invention incorporates a magnet 94 with an outside diameter of approximately 18 mm and an inside diameter of approximately 16 mm, resulting in a thickness of 1 mm, At the same time, the neodymium produces an energy product of at least twenty and preferably twenty-one Mega Gauss-Oersteds (MGOe). The high energy product magnet 94 therefor produces a high torque within the spindle motor 24 while simultaneously reducing the volume required.

The high energy product magnet 94 provides increased startup and running torque to overcome large drag forces. Prior to magnetic head 34 lift-off, the spindle motor 24 must primarily overcome frictional drag forces between the heads and the disks 28, 29. From head take-off to operating speeds of approximately 3600 rpm, the drag forces are mainly internal to the bearings 88, 90 with some aerodynamic contribution from the spinning disks 28, 29.

Presently, bearing greases containing lithium are preferred for their low viscosity and thus low starting and running friction. Typical lithium-based greases have a viscosity at ambient temperatures of approximately 90 centistokes which reduces to 19 centistokes at typical running temperatures. The improved neodymium magnet 94, in a disk drive 20 having four heads on two disks, will generate a minimum starting torque of 60 g-cm and a running torque of approximately 12 g-cm allowing the use of higher viscosity bearing greases such as Nygace/W. Nygace/W has a viscosity at ambient temperatures of approximately 160 centistokes and approximately 40 centistokes at typical running temperatures. Thus, the improved torque of the present spindle motor 24 can accommodate the higher bearing drag which eliminates the necessity of using lithium-based bearing greases.

The activated charcoal adsorption filter 60 previously described works together with the high torque of the spindle motor 24 to both reduce the amount of hydrocarbons within the disk drive housing and overcome increases in the coefficient of friction of the disk surfaces. Any hydrocarbons which escapes the filter 60 and deposit on the disks 28, 29 may slightly increase the coefficient of friction but not to a great degree and the high torque motor 24 will be able to overcome such residual contamination. Preferably, the improved neodymium magnet allows the spindle motor 24 to overcome coefficients of friction of the disks 28, 29 up to a value of 1.5.

Figure 4:
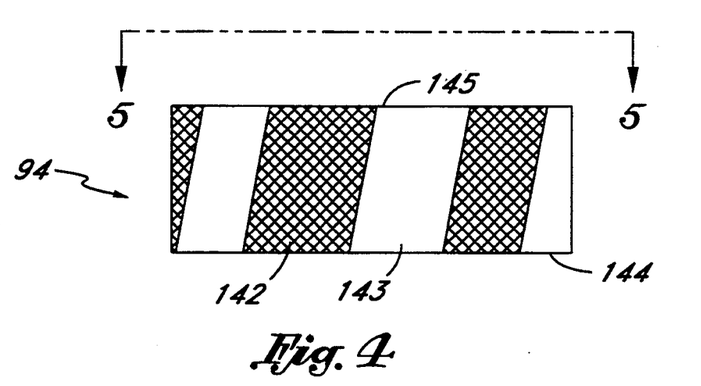
FIG. 4 is a side elevational view of the spindle motor magnet showing the skewed longitudinal orientation of the poles.
Figure 5:
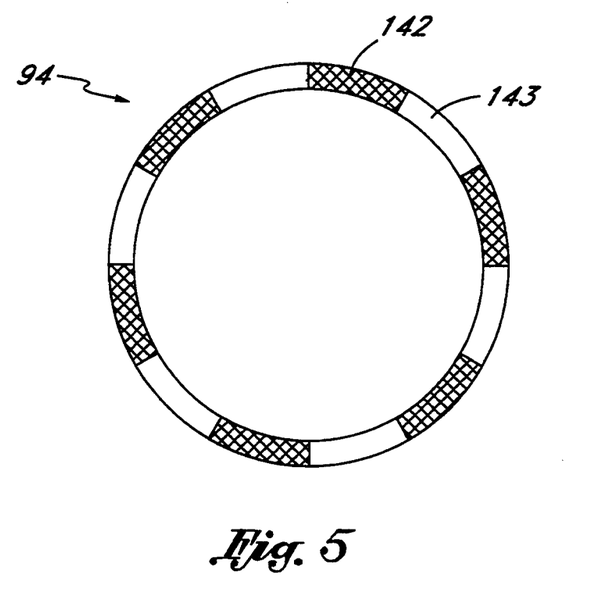
FIG. 5 is a top plan view of the spindle motor magnet showing the circumferential distribution of poles.

The current spindle motor magnet 94 incorporates a skewed pole configuration to lessen the effect of cogging. As shown in FIGS. 4 and 5, the magnet 94 includes twelve alternating poles 142, 143 around its circumference arranged at an angle from the upper edge 145 to the lower edge 144 of the magnet. This angle, or skew, is preferably approximately 11° from the axis of the annular magnet 94. The skew provides a slight overlap between the attraction of one pole and the repulsion of the next pole to the spokes of the stator 96 so that there is a smoothed discontinuity at the transition between poles. The result is a high torque motor 24 which avoids many of the previous problems with high energy product magnets.

While the above description represents the preferred embodiment, the present invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. A small form factor disk drive having a base and a cover attached thereto providing an inner space in which a spindle motor is disposed, said motor comprising:
    an inverted cup-shaped rotor sized to receive central bores of one or more data disks;
    a rotor shaft integral with said rotor extending downward from the rotor to rotate within an upstanding flange from said base;
    an annular stator frame bonded to the outside of said flange and comprising outwardly extending spokes for supporting electrical coil windings; and
    an annular magnet bonded to the inner wall of said rotor and arranged to rotate concentrically around said stator, said magnet having a thickness of greater than 0 and less than 1 mm, said magnet having alternating poles around the circumference arranged at a slight vertical skew angle such that interfaces between alternating poles on the top edge are offset slightly from those on a bottom edge of said magnet.

2. The small form factor disk drive of claim 1, wherein said skew angle is 11 degrees.

3. The small form factor disk drive of claim 1, wherein three continuous windings are distributed around the nine spokes of said stator such that each winding goes around three spokes arranged 120° apart, said three windings being alternatively energized to react with the surrounding magnetic poles resulting in a smoothed torque profile.

4. The small form factor disk drive of claim 1, further comprising:
    one or more annular bearings bonded to both the downwardly extending rotor shaft and base flange to provide rotational coupling therebetween, whereby a bearing grease used within said bearings contains no lithium.

5. The small form factor disk drive of claim 4, wherein said bearing grease has a viscosity of at least 160 centistokes at 40° F.

6. The small form factor disk drive of claim 4, wherein said bearing grease has a viscosity of at least 40 centistokes at a temperature of 140° F.

7. The small form factor disk drive of claim 1, wherein said annular magnet comprises twelve alternating poles.

8. The small form factor disk drive of claim 1, wherein said annular magnet has an energy product greater than 20 Mega-Gauss Oersteds.

9. A disk drive having a stationary base with a tubular flange upstanding therefrom, comprising:
   an annular stator mounted to the exterior surface of said tubular flange and having electrical leads depending therefrom;
   one or more annular bearings bonded to the inner surface of said tubular flange;
   a spindle having a downwardly extending central shaft bonded to the inner bore of said bearing(s), an upper circular top portion and an outer rim extending down around said tubular flange, said rim comprising an outwardly projecting ledge providing support for one or more data disks having central apertures sized to fit over said outer rim; and
   an annular magnet bonded to the inner wall of said rim so that a small radial gap exists between a central bore of said magnet and said stator;
   wherein said base, said bearing(s) and said spindle are all constructed of steel and have similar thermal expansion rates so that the bearings will experience minimal compressive stresses during an increase in the temperature generated by rotational friction.

10. The disk drive of claim 9, further comprising a ring-shaped aluminum sole to the upper edge of said ledge to form a disk contacting surface.

11. The disk drive of claim 9, wherein said magnet is constructed of neodymium and has an energy product in excess of 20 Mega-Gauss Oersteds.

12. The disk drive of claim 9, whereby the inner surface of said tubular flange comprises a pair of circular grooves for each bearing to be bonded therewith.

13. The disk drive of claim 9, whereby the central shaft of said spindle comprises a pair of circular grooves for each bearing to be bonded therewith.

14. The disk drive of claims 12 or 13, wherein one of said pair comprises a bonding groove while the other comprises a reservoir groove, the bonds between said tubular flange and said bearings and between said spindle and said bearings being primarily formed in said bonding grooves.

15. The disk drive of claim 9, wherein in an assembled state, said bearings are subject to a diagonal preload of between one and two pounds.

16. The disk drive of claim 9, wherein in an assembled state, said bearings are subject to a diagonal preload of approximately lone and one-half pounds.

17. The disk drive of claim 14, wherein one of said pair comprises a bonding groove while the other comprises a reservoir groove, the bonds between said tubular flange and said bearings and between said spindle and said bearings being primarily formed in said bonding grooves.

18. A disk drive having a base and cover for said base, comprising:
   an annular stator mounted to the exterior surface of a tubular flange integral with said base having electrical leads depending therefrom;
   one or more annular bearings bonded to the inner surface of said tubular flange;
   a spindle having a downwardly extending central shaft bonded to the inner bore of said bearing(s) and an inverted cup-shaped disk-support hub depending down around said tubular flange, said hub comprising an outwardly projecting ledge upon which a ring-shaped aluminum sole forms a surface providing support for a data disk having a central aperture sized to over said hub, said surface precisely machined to ensure said disk rotates at a specific predetermined height above said base; and
   an annular magnet bonded to the inner wall of said hub so that a small radial gap exists between a central bore of said magnet and said stator;
   wherein said base and said spindle are constructed of Nickel-plated Martensitic steel and said bearing(s) material has a thermal expansion rate within ten (10%) percent of that of Martensitic steel of the base and spindle.

19. The disk drive of claim 18, whereby the inner surface of said tubular flange comprises a pair of circular grooves for each bearing to be bonded therewith.

20. The disk drive of claim 18, whereby the central shaft of said spindle comprises a pair of circular grooves for each bearing to be bonded therewith.

21. The disk drive of claims 19 or 20, wherein one of said pair comprises a bonding groove while the other comprises a reservoir groove the bonds between said tubular flange and said bearings and between said spindle and said bearings being primarily formed in said bonding grooves.

22. The disk drive of claim 18, wherein the base and spindle are constructed of Nickel-plated Martensitic steel.

23. A small form factor disk drive having a base and a cover attached thereto providing an inner space in which a spindle motor is disposed, said motor comprising:
   an inverted cup-shaped rotor comprising an upper circular top portion and an outer rim, said rim comprising an outwardly projecting ledge providing support for one or more data disks having central apertures sized to fit over said outer rim;
   an annular rotor shaft integral with said rotor extending downward form the rotor to rotate about an upstanding shaft from said base;
   an annular stator frame bonded to the inside of an upstanding tubular flange on said base and comprising outwardly extending spokes for supporting electrical coil windings; and
   an annular magnet bonded to the outer wall of said annular rotor shaft and arranged to rotate concentrically within said annular stator, said magnet having a thickness of greater than zero and less then 1 mm, said magnet having alternating poles around the circumference arranged at a slight vertical skew angle such that interfaces between alternating poles on a top edge are offset slightly from those on a bottom edge of said magnet.

24. The disk drive of claim 23, wherein said skew angle is 11 degrees.

25. The disk drive of claim 23, wherein the annular stator frame comprises nine outwardly extending spokes and said annular magnet has 12 alternating poles around its circumference and wherein three continuous windings are distributed around the nine spokes of said stator such that each winding goes around three spokes arranged 120° apart, said three windings being alternatively energized to react with the surrounding 12 magnetic poles resulting in a smooth torque profile.

26. The disk drive of claim 23, further comprising a ring-shaped aluminum sole to the upper edge of said ledge to form a disk contacting surface.

27. The disk drive of claim 23, further comprising:
one or more annular bearings bonded to both the downwardly extending annular rotor shaft and upstanding base shaft to provide rotational coupling therebetween; and
a bearing grease used within said bearings which contains no lithium.

28. The disk drive of claim 27, wherein said bearing grease has a viscosity of at least 160 centistokes at 40° F.

29. The disk drive of claim 27, wherein said bearing grease has a viscosity of at least 40 centistokes at a temperature of 140° F.

30. The disk drive of claim 27, whereby the inner surface of said annular rotor shaft comprises a pair of circular grooves for each bearing to be bonded therewith.

31. The disk drive of claim 27, whereby the upstanding shaft of said base comprises a pair of circular grooves for each bearing to be bonded therewith.

32. The disk drive of claim 31, wherein one of said pair comprises a bonding groove while the other comprises a reservoir groove, the bonds between said tubular flange and said bearings and between said spindle and said bearings being primarily formed in said bonding grooves.

33. The disk drive of claim 23, wherein the annular magnet has an energy product greater than 20 Mega-Gauss Oersteds.

* * * * *